US006243745B1

(12) United States Patent
Casey et al.

(10) Patent No.: US 6,243,745 B1
(45) Date of Patent: Jun. 5, 2001

(54) CONFIGURING COMPUTER NETWORK OPERATIONS BASED UPON THE CORRELATION OF A SEQUENCE OF INTERACTIVE DISPLAY USER ENTRIES APPARENTLY UNRELATED TO COMPUTER OPERATIONS

(75) Inventors: Walter William Casey; Jeffrey Randell Dean; Ingrid Milagros Rodriguez, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/118,208

(22) Filed: Jul. 17, 1998

(51) Int. Cl.[7] .................................................. G06F 15/177
(52) U.S. Cl. ...................... 709/220; 709/221; 709/222; 709/223; 709/225; 709/226; 709/229
(58) Field of Search ..................................... 709/220, 221, 709/222, 223, 225, 226, 229

(56) References Cited

U.S. PATENT DOCUMENTS

| | | | |
|---|---|---|---|
| 5,819,042 | * 10/1998 | Hansen | 709/222 |
| 5,887,139 | * 3/1999 | Madison, Jr. et al. | 709/223 |
| 6,009,466 | * 12/1999 | Axberg et al. | 709/220 |
| 6,012,100 | * 1/2000 | Frailong et al. | 709/250 |
| 6,041,347 | * 3/2000 | Harsham et al. | 709/220 |
| 6,052,719 | * 4/2000 | Bezanson et al. | 709/220 |

* cited by examiner

Primary Examiner—Saleh Najjar
(74) Attorney, Agent, or Firm—J. B. Kraft; Leslie A. Van Leeuwen

(57) ABSTRACT

A system is provided for the configuration of operations in a network comprising at least a server computer and a respective plurality of client computers connected to each server computer. The system involves the combination of means for interactively prompting a user to make a sequence of data entries, each of said entries being apparently unrelated to computer operations and covering a demographic aspect of the business environment using the network, and means for allocating network computing components and operations among the computers in the network in response to and based upon said user entries. All of the programming resources which are allocated may be found in the server and the algorithms for allocating and distributing are also on the server. The allocation of programs by the server computer is based upon user profiles for each user developed as a result of the data entries made in response to the above-described prompt panels.

29 Claims, 10 Drawing Sheets

FIG.5

```
Company Address and Phone
Type your company's address, phone and fax numbers below. This
information may be required for licensing and software registration.
  Mailing Address
  [                    ]

Physical Address
  [                    ]

Phone  [        ]
             Fax  [        ]

[ Help ] [ < Back ] [ Next > ] [ Cancel ]
```

FIG.6

```
Internet Pricing
To obtain internet access, you will want to review the current pricing
schedule below. If you agree to the pricing defined, you will need to
enter credit card information for the charges. The billing will occur
monthly. If you chose not to obtain internet access, leave the card
information blank and click on Next.

┌─ Pricing ──────────────────┐
 │ $100.00 / Month for 130 hours/│      ┌─────────────────────────┐
 │ month                        │      │ Review Terms and Conditions │
 │ $1.10 / Hour for Each        │      └─────────────────────────┘
 │ Additional Hour Actually Used│
 └──────────────────────────┘
 ┌─ Credit Card Info ──────────┐
 │  Card Number                │
 │    [ Text1 ]         ──── 61
 │         [ Text2 ]    ──── 62
 └──────────────────────────┘

[ Help ] [ < Back ] [ Next > ] [ Cancel ]
```

FIG.9

Backup Schedule

Your data will automatically be backed up at the times you indicate below. Online backup means your data will be copied to a computer system at another location. Tape backup means your data will be copied to magnetic tape and stored at another location. Backup should be done at a time when people are not working on the system. Type the times below that are outside of your normal working hours.

Scheduling

How early do employees start work?

[6:00AM] — 67

How late do employees leave work?

[8:30PM] — 68

How often do you want to back up your data?

[Sundays Only]

[Help] [< Back] [Next >] [Cancel]

FIG.10

Data Security

To make sure that your data is secure, you will be asked to type a key (password) to access the data that Connected Online Backup has stored for you. The key can be any combination of up to ???? characters, with no spaces. For future reference, make a note of the key and indicate if you have used upper or lower case characters. For added safety, you can store a copy of the key with the Connected Online Backup service by checking the box below.

Data Encryption — 69

Key [xxxx]

Retype Key [xxxx]

Store the Key Offsite also [☑]

— 70

[Help] [< Back] [Next >] [Cancel]

FIG.11

User Profile — 71

Full Name [ ]    Group [ ]
User Name [ ]    Job [ ]
                          72

Hours / Day of use
of computer [ ] — 73
Hours of Graphics use [ ] — 74

Can you read this?
Check lowest level

My dog is Red      ☐
My dog is Red      ☐    76
My dog is Red      ☐
75   My dog is Red      ☑
My dog is Red      ·

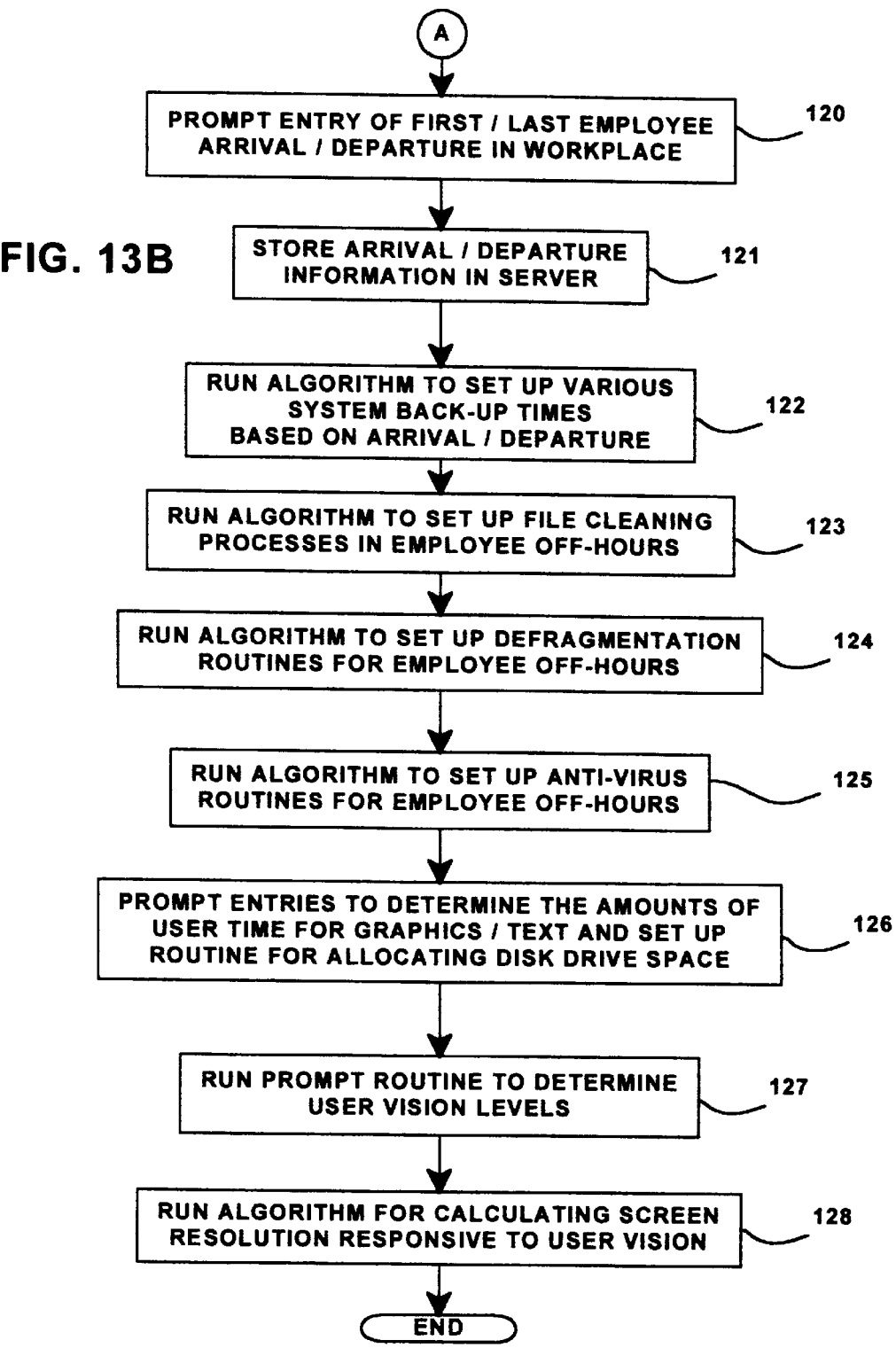

CONFIGURING COMPUTER NETWORK OPERATIONS BASED UPON THE CORRELATION OF A SEQUENCE OF INTERACTIVE DISPLAY USER ENTRIES APPARENTLY UNRELATED TO COMPUTER OPERATIONS

CROSS-REFERENCE TO RELATED APPLICATIONS

The present patent application is related to Ser. No. 09/118,211, entitled "SIMPLIFIED SETTING UP OF A NETWORK OF A SERVER COMPUTER PRELOADED WITH ALL COMPUTER PROGRAMS REQUIRED BY A GROUP OF CLIENT COMPUTERS TO BE CONNECTED INTO NETWORK" U.S. Ser. No. 09/078,934 pending which is hereby incorporated by reference herein.

The present patent application is related to Ser. No. 09/118,555, entitled "AUTOMATIC CLEANUP OF USER DATA IN A NETWORK ENVIRONMENT pending" which is hereby incorporated by reference herein.

In addition, the following applications are also related to the present invention:

The present patent application is related to Ser. No. 09/118,559, entitled "SYSTEM AND METHOD FOR CREATION OF A NETWORK COMPUTING ENVIRONMENT" pending.

The present patent application is related to Ser. No. 09/118,557, entitled "DATA PROCESSING SYSTEM, METHOD, AND PROGRAM PRODUCT FOR AUTOMATING ACCOUNT CREATION IN A NETWORK" pending.

The present patent application is related to Ser. No. 09/118,293, entitled "COMPUTER SOFTWARE SYSTEM FOR ELIMINATING OPERATING SYSTEM MULTIPLE LOGINS UNDER REMOTE PROGRAM LOAD WITH NETWORK PROVIDER DYNAMIC LINK LIBRARY" pending.

The present patent application is related to Ser. No. 09/118,208, entitled "CONFIGURING COMPUTER NETWORK OPERATIONS BASED UPON A SEQUENCE OF INTERACTIVE USER ENTRIES INTO A NETWORK SERVER COMPUTER WITH A ONE TIME ENTRY OF DATA COMMONLY REQUIRED BY MULTIPLE CLIENTS".

The present patent application is related to Ser. No. 09/118,291, entitled "NETWORK WITH STORAGE OF ALL CLIENT COMPUTER PROGRAMS IN SERVER COMPUTER HAVING CUSTOMIZED CLIENT GRAPHICAL USER INTERFACES WITH MAXIMUM SHARING OF STORED PORTIONS OF INTERFACES COMMON TO A PLURALITY OF CLIENTS" pending.

The present patent application is related to Ser. No. 09/118,292, entitled "SERVER AND COMPUTER NETWORK THAT PERMIT A CLIENT TO BE EASILY INTRODUCED INTO THE COMPUTER NETWORK" now U.S. Pat. No. 6,108,779.

The present patent application is related to Ser. No. 09/118,209, entitled "METHOD AND APPARATUS FOR ALLOWING A USER TO ROVE AMONG VARIOUS CLIENTS IN A NETWORK WHILE MAINTAINING INDIVIDUAL HARDWARE AND SOFTWARE PREFERENCES" pending.

The present patent application is related to Ser. No. 09/118,207, entitled "METHOD AND APPARATUS FOR CREATING A PRELOAD IMAGE" pending.

The present patent application is related to Ser. No. 09/118,558, entitled "METHOD AND APPARATUS FOR ALLOWING A USER TO ROVE AMONG VARIOUS CLIENTS IN A NETWORK WHILE MAINTAINING INDIVIDUAL HARDWARE PREFERENCES" pending.

The present patent application is related to Ser. No. 09/118,556, entitled "METHOD AND APPARATUS FOR DETECTING AND INITIALIZING THE ADDITION OF A NEW CLIENT MACHINE IN A NETWORK" now U.S. Pat. No. 6,105,100.

TECHNICAL FIELD

The present invention relates to a system, method and program for the configuration of a computer network and particularly a local network of server computers and client computers in a manner which is expeditious and involves very little down time of the network or its components.

BACKGROUND OF THE INVENTION

Computers and their application programs are used in all aspects of business, industry and academic endeavors. In recent years, there has been a technological revolution driven by the convergence of the data processing industry with the consumer electronics industry. This advance has been even further accelerated by the extensive consumer and business involvement in the Internet. As a result of these changes it seems as if virtually all aspects of human productivity in the industrialized world requires human/computer interaction. The computer industry has been a force for bringing about great increases in business and industrial productivity. Almost every week seems to bring computer industry advances which promise even further increases in productivity. These advances offer to drive down business and industry costs and increase efficiency, in addition to increasing productivity. In addition, the cost of "computer power" continues to drop as result of rapid advances in computer related technologies.

Despite all of these advantages, there still remains great resistance in all industries and business fields to new computer systems and significant system upgrades which offer much in productivity increases. This resistance results from past experience which equates to installing new computer systems or significant upgrades in existing systems with large amounts of down time, during which the business, manufacturing facility or individual worker functions are inoperative or operate at diminished levels. When a business or production facility is trying to decide whether to install a new or significantly upgraded computer system, the concern about down time, the possible loss of business as well as stress on the workers involved, very often outweighs the cost of the installation in influencing the decision. The concern about business and production delays resulting from installation has become so great that fewer and fewer small businesses are trying to make system and program changes on their own. The professional computer service industry which carries out and supports installations and upgrades for the business and industrial sector has been rapidly expanding over the past decade. However, even with such computer professional support the threat of such down time coupled with the costs of such professional services caused by installation delays remains of great concern.

In order to make computer installation and all aspects of human/computer interfacing less confusing, there is a need to make computer directed activities easier to understand for a substantial portion of the world's population, which, up to a few years ago, was computer illiterate, or, at best, computer indifferent. For the vast computer supported market places to continue and be commercially productive it will be necessary for a large segment of computer indifferent consumers to be involved in computer interfaces. Thus, the challenge of our technology is to create interfaces to computers which are as close to the real world as possible. Nowhere is this challenge more vital than in the installations of computer and computer networking systems for small businesses. In this marketplace, we are dealing with a group whose available time is being stressed to its limits by the pressures of current economic systems. Even though the computer systems procurable by these business people may offer their eventual salvation to their other business stresses, the prospect of a new computer installation is often quite ominous to them. Salespeople offering new systems may be met with phrases like, "We don't have the time to hack around with the computer; we have got to make a buck.".

This view has a reasonable validity. The giant computer industries of today arose over the past 60 years out of a small and esoteric group of specialists who developed their own jargon when referring to computer functions. Unfortunately, when the consumer industry of today evolved with hundreds of millions of potential computer systems consumers, these terms and their like successors, e.g. "meg, gig, RAM, frag, backup" and an infinite number of pseudonyms, still dominate the consumer end of the business. All of this is quite threatening to many in small businesses and makes them resist their inevitable computerization.

SUMMARY OF THE INVENTION

The present invention provides a solution to the above problems by providing to small businesses and like enterprises a computer controlled display interface for the installation of a local network wherein the prompts for data entries substantially request information which is apparently unrelated to computer operations. The information is more like the demographic information which an employer or business might have to fill out or enter for business tax purposes or to get zoning waivers or apply for insurance.

The present invention provides a system for the configuration of operations in a network comprising at least a server computer and a respective plurality of client computers connected to each server computer comprising means for interactively prompting a user to make a sequence of data entries, each of said entries being apparently unrelated to computer operations and covering a demographic aspect of the business environment using the network, and means for allocating network computing components and operations among the computers in the network in response to and based upon said user entries. The system has algorithms for correlating the entries and for allocating said network computing components and operations responsive to the correlation.

The client computers are preferably interactive display computers accessible to users in the business environment, and the system also includes means for storing a user profile of computing components and operations allocated for each user based upon said correlated data entries. The correlation and allocation is carried out on the server computer. When user profiles are stored, they are in the server computer.

BRIEF DESCRIPTION OF THE DRAWINGS

FIG. 5 is the diagrammatic view of the dialog panel for entry of business address information;

FIG. 6 is a dialog panel for the entry of user information for setting up an Internet provider for the business setting up the local network;

FIG. 9 is a dialog panel for providing first in/last out employee information to provide time for backup and other off-time functions:

FIG. 10 is a dialog panel for the setting up of data security;

FIG. 11 is a dialog panel for establishing user profiles, as well as user vision levels so as to set screen resolution;

FIGS. 13A and 13B make up a flowchart of a simplified run illustrating the program of FIG. 12.

DETAILED DESCRIPTION OF THE PREFERRED EMBODIMENT

Figure 1:
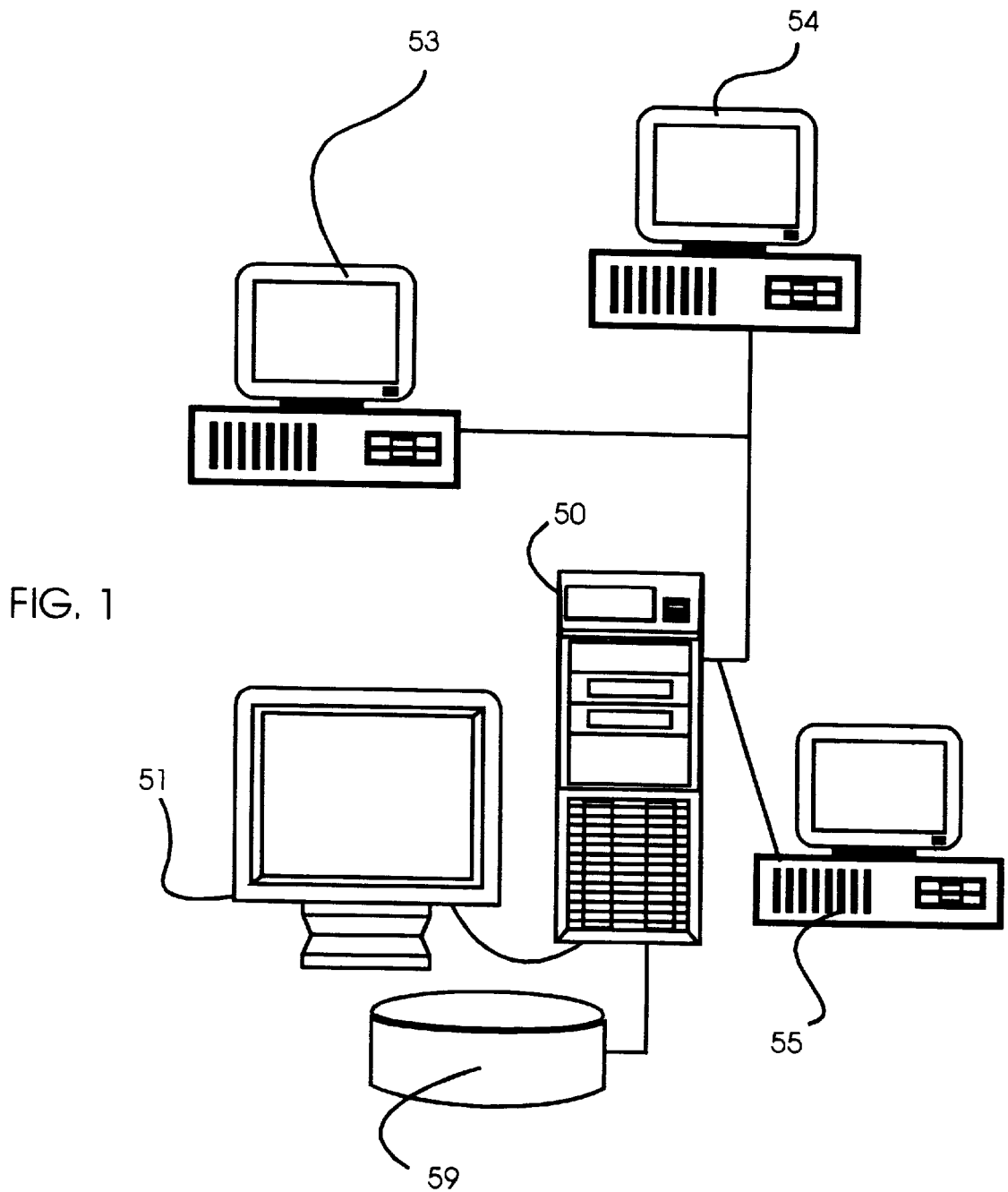
FIG. 1 is a generalized diagrammatic view of a network of server and client computers which may be configured according to the present invention.

With reference to FIG. 1 there is shown a representative diagram of a local network in which the present invention may be illustrated. There is a server computer 50 which has a plurality of client computers: clients 53, 54 and 55. As will be subsequently described with respect to FIGS. 3 through 11, all configuration entries and settings are made into and stored in server 50 through its display interface 51. All programs for the network and for the computers in the network are also loaded into server 50 and stored in storage facility 59, which is a diagrammatic representation of the primary server storage capability usually on an associated disk drive. As will be seen from the subsequent description, all of the programs to be used in the overall network are stored in association with server 50, e.g. in its storage facility 59, and then distributed as needed to the network users who will sign on to the client computers 53 through 55. The server 50 will allocate the appropriate programming applications to the signed-on users at the appropriate client computers. In the preferred operations, there will be little in the way of programs stored in the clients other than the operating systems and basic utilities needed to run the client computers.

Figure 2:
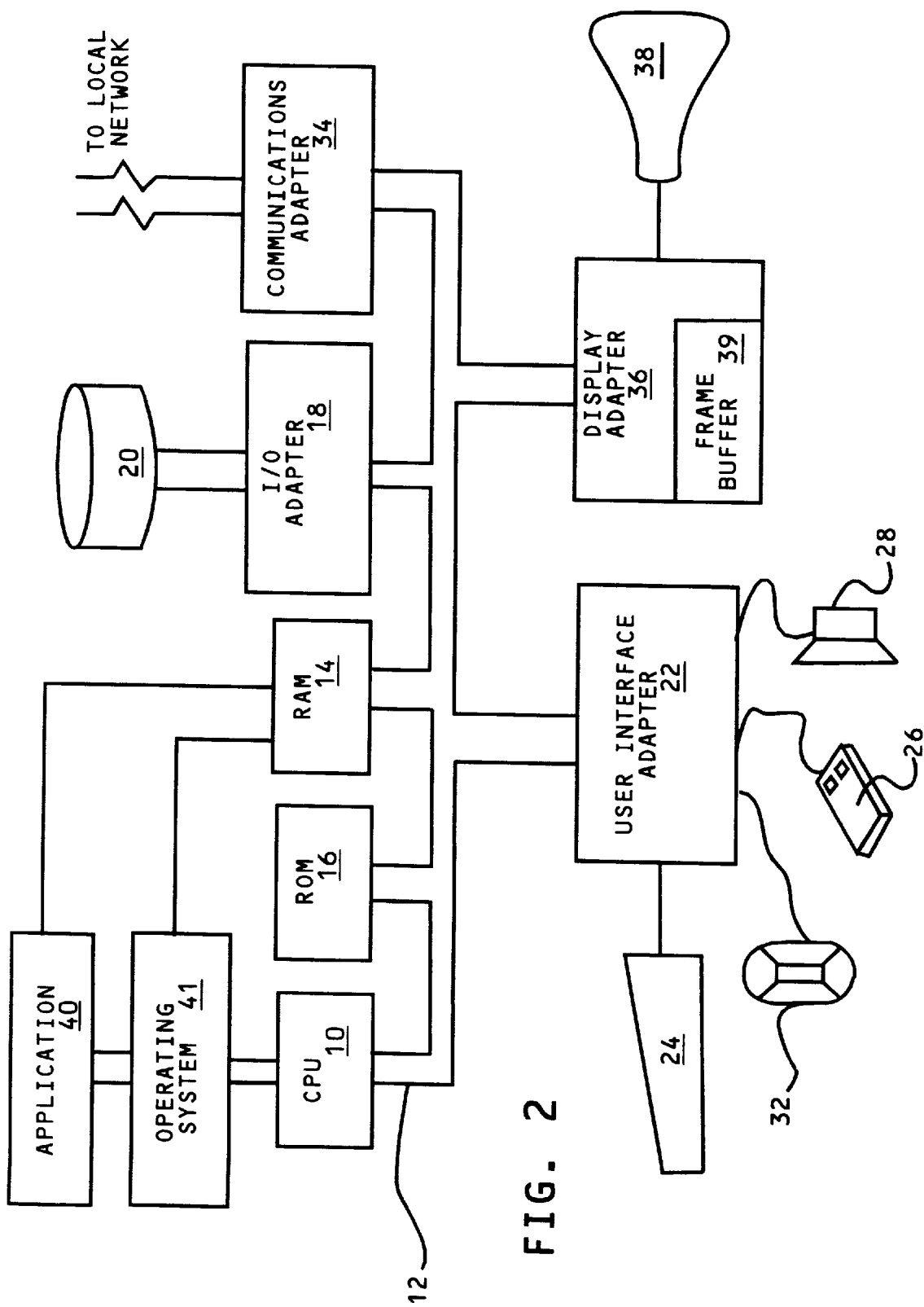
FIG. 2 is a block diagram of an interactive data processor controlled workstation display system including a central processing unit which is capable of serving as the primary server of this invention.
Figure 3:
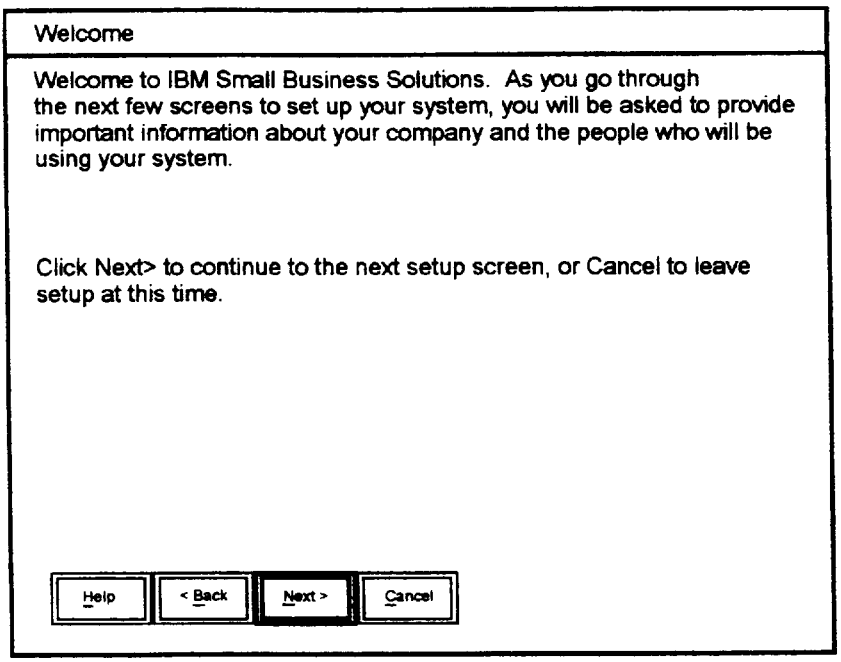
FIG. 3 is a diagrammatic view of an interactive dialog screen on the network server introducing the data entry screens to configure the network installation of the present invention.
Figure 4:
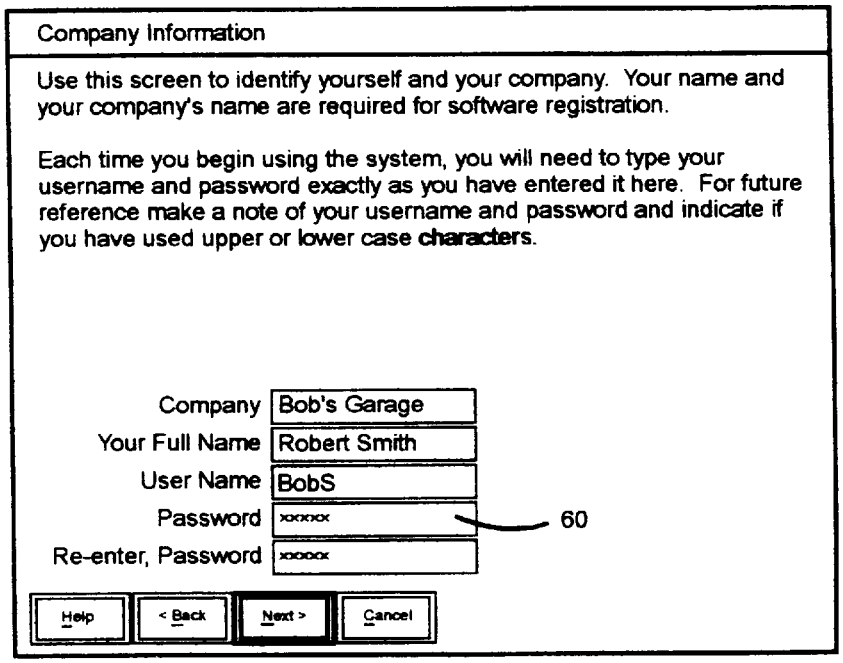
FIG. 4 is the diagrammatic view of an interactive dialog panel for entering company/business information.

FIG. 2 is a diagram of a display interface workstation which can function as the primary server 50. A central processing unit (CPU), such as in one of the PC Server series of workstations available from International Business Machines Corporation, or the Poweredge 2200 ("Poweredge 2200" is a trademark of Dell Corporation) server from Dell Corporation, is provided and interconnected to various other components by system bus 12. An operating system 41 runs on CPU 10 and provides control and is used to coordinate the function of the various components of FIG. 2. Operating system 41 may be one of the commercially available operating systems such as Microsoft's Windows NT™, IBM's Netview™ or Novell's NetWare™. UNIX or AIX Network operating systems may also be used. The programming application for controlling all of the entries and consequent network configurations to be subsequently described for FIGS. 3 through 11, application 40, runs in conjunction with operating system 41 and provides output calls to the operating system 41 which implement the various functions to be performed by the application 40. A read only memory (ROM) 16 is connected to CPU 10 via bus 12 and includes the basic input/output system (BIOS) that controls the basic computer functions. Random access memory (RAM) 14, which will provide for a portion of the basic storage of entries to be subsequently described; I/O adapter 18 and communications adapter 34 are also interconnected to system bus 12. It should be noted that software components, including the operating system 41 and the application 40, are loaded into RAM 14, which is the computer system's main memory. I/O adapter 18 conventionally communicates with the disk storage device 20, i.e. a hard drive which may also be involved in the subsequently described storage. Communications adapter 34 interconnects bus 12 with the rest of the local network described in FIG. 1 enabling the data processing system to communicate with its client computers, as well as other servers and client computers to control entry configurations and installations to be subsequently described. I/O devices are also connected to system bus 12 via user interface adapter 22 and display adapter 36. Keyboard 24, trackball 32, mouse 26 and speaker 28 are all interconnected to bus 12 through user interface adapter 22. It is through such input devices that the user interactive functions involved in the present invention may be implemented. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38.

There will now be described a simple illustration of the present invention with respect to the display screens of FIGS. 3 through 11. When the screen images are described it will be understood that these may be rendered by storing an image and text creation programs, such as those in any conventional window operating system in the RAM 14 of the system of FIG. 2. The operating system is diagrammatically shown in FIG. 2 as operating system 41. Display screen images are presented to the viewer on display monitor 38 of FIG. 2. In accordance with conventional techniques, the user may control the screen interactively through a conventional I/O device, such as mouse 26 of FIG. 2 which operates through user interface 22 to call upon programs in RAM 14 cooperating with the operating system 41 to create the images in frame buffer 39 of display adapter 36 to control the display on monitor 38.

Figure 7:
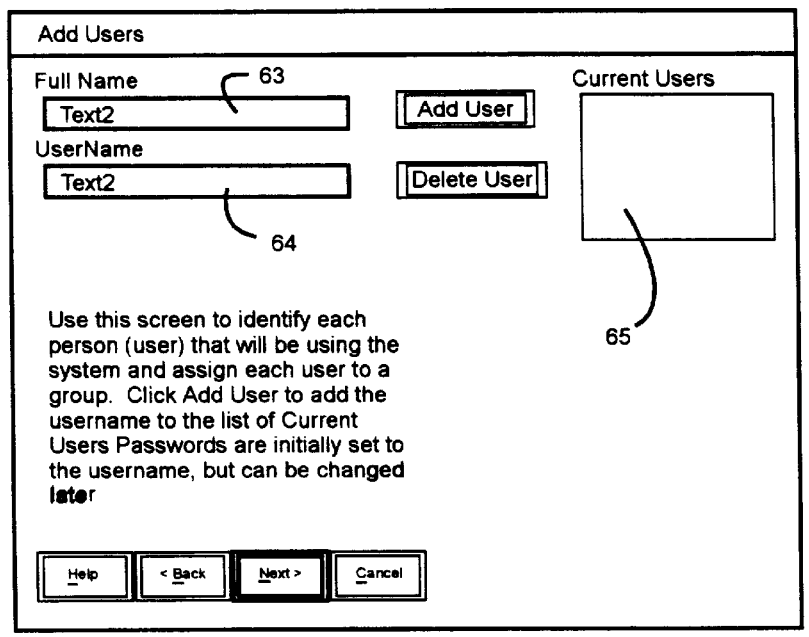
FIG. 7 is a dialog panel for adding users to the network configuration.
Figure 8:
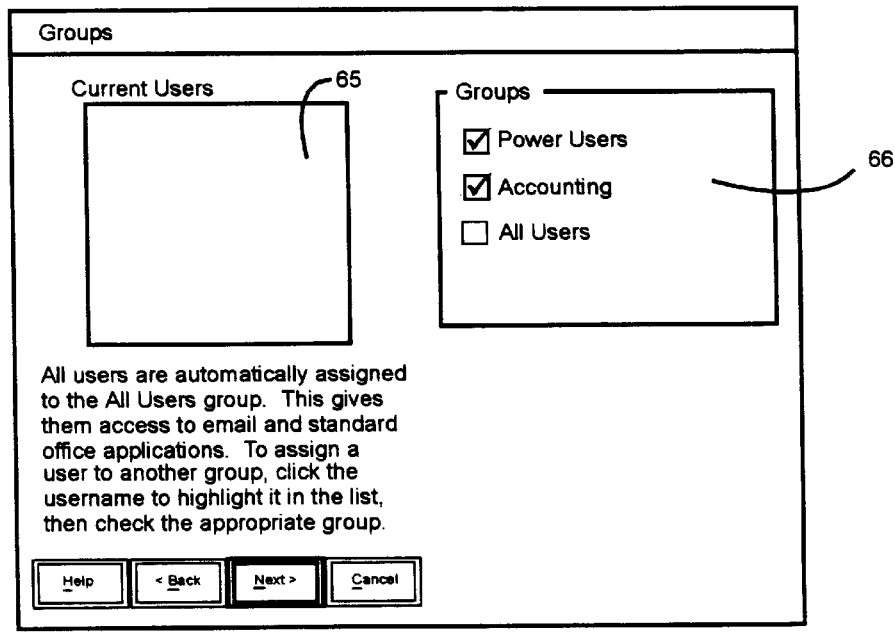
FIG. 8 is a dialog panel for organizing users according to work groups.

As has been set forth hereinabove, all of the programs to be used by all of the users in the network of FIG. 1 are stored in server 50 and its associated storage facility 59. Now with respect to FIGS. 3 through 11, we will describe how noncomputer related information is solicited from users so that these programs and related computer resources may be allocated among the users of the network. The illustration will involve allocations within a small business network. Please note with respect to FIG. 1 the data entry panels shown in FIGS. 3 through 11 may be interactively shown to users on display 51 of server 50 or the data entry may be done on any of the displays of clients 53 through 55. The entries may be made by the employees or users themselves or by some sort of supervisory personnel. For the present illustration, we will assume that the entries are made to display 51 by an office supervisor. The introductory screen panel of FIG. 3 advises the user that what in effect will be noncomputer related information will be solicited and that this information will be used to configure the company's computer network. Then the screen panel of FIG. 4 solicits company and user information including password 60. Next, the screen panel of FIG. 5 gets information about address, phone and facsimile numbers, after which the screen panel of FIG. 6 prompts the user to price out a variety of Internet providers, select a provider and to enter user or company credit card information via data entry fields 61 and 62 to complete the Internet set up. FIG. 7 shows a display panel through which the current users 65 may be organized and new users may be entered through data entry fields 63 and 64. FIG. 8 is a display panel through which the users 65 may be assigned to functional groups 66 so that this information may be used to allocate program resources. Next, the user may be prompted with a panel, FIG. 9, which will be used to allocate system backup. It prompts for employee start/leave information via data entry fields 67 and 68 so that this information may be used to set likely computer quiescent periods for backing up stored computer data. Such quiescent periods may also be used for other off-use functions such as defragmentation of files stored on disk drives, the general cleaning up of files and other housekeeping functions such as the running of antivirus routines.

The user may also be presented with a data security display panel, FIG. 10, in which data encryption key entries 69 and 70 are prompted for. In the data entry panel of FIG. 11, group and job function information entries 71 and 72 are prompted for, which will be used to allocate programs for the particular user. Also, the employee's computer hours are solicited 73, and particularly graphic hours 74 are important since the system may use this information in an algorithm for setting aside storage space to store and support the user's activities. The panel or a like panel may be used to automatically adjust the displays to the user's vision requirements. This illustration shows a simple routine where the viewer is prompted to read the smallest print in group 75 and indicate it by an appropriate selected entry 76. The system will then provide an appropriate screen resolution to compensate for eyesight variations.

Figure 12:
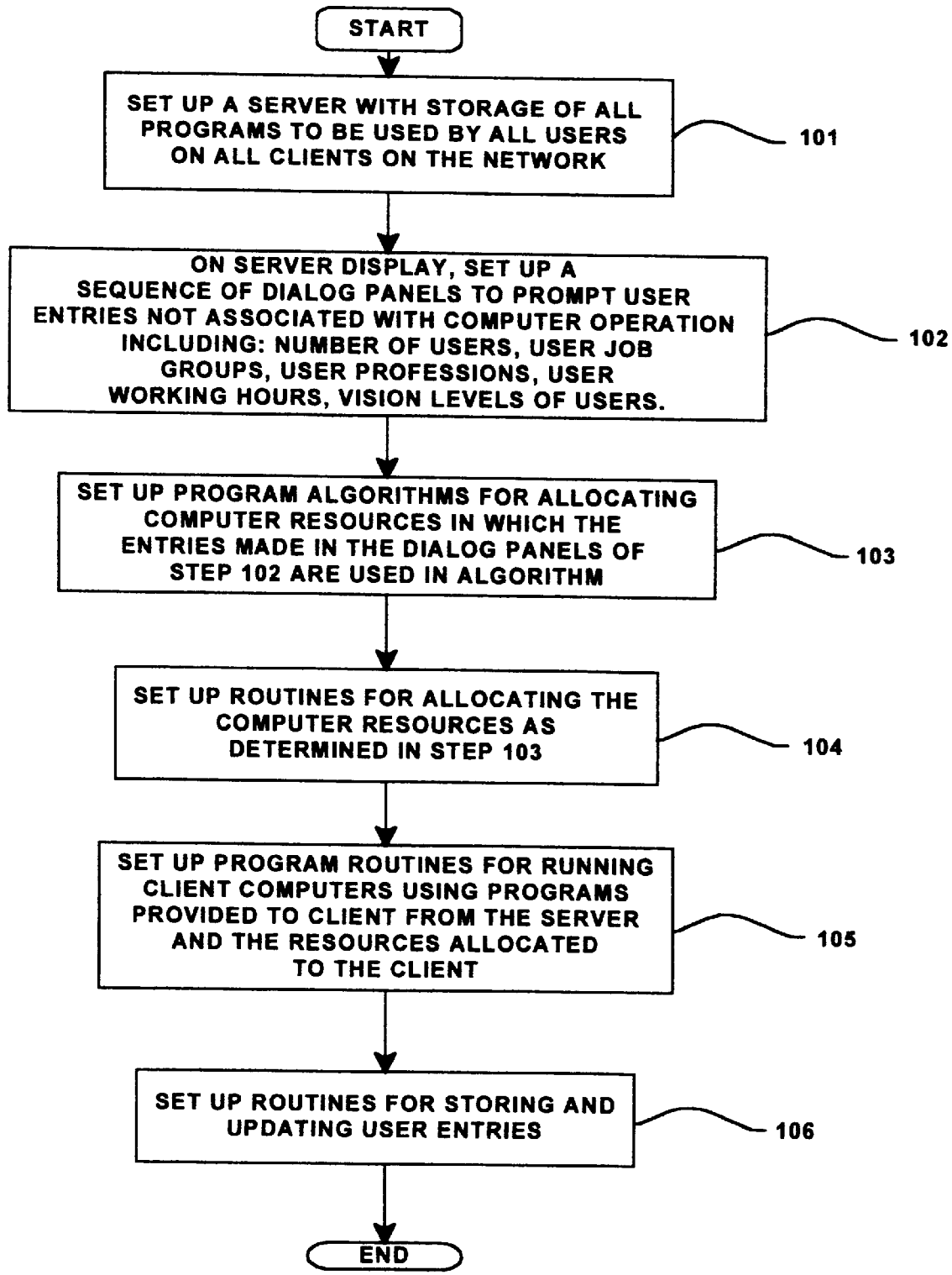
FIG. 12 is a flowchart of the basic elements of the program in the server computer which enables the server to control the data entry and network installation and configuration described with respect to FIGS. 3 through 11.

Now with respect to FIG. 12, there will be generally described the basic elements of the program in the server computer which enables the server to control the data entry and network installation operations described with respect to FIGS. 3 through 11. The server 50, FIG. 1, is set up with all programs to be used by a variety of users on the client computers in the network, step 101. A program is set up on the server 50 to display on display 51 a sequence of dialog panels to prompt user entries which are apparently unassociated with any specific computer operations, step 102. FIGS. 3 through 11 are illustrative of such panels. Then there is set up in the system, step 103, a series of appropriate algorithms for converting the entries, such as those in the panels of FIGS. 3 through 11, into means for allocating appropriate programming resources for user and client functions. Given the concept of the present invention, i.e. the use of user entry prompts to solicit noncomputer related data from users which is then converted into computer meaningful data, it should be understood that any number of algorithms could be used for such conversions. For example, given that backing up of files should be done during hours when no employees are present, then the simple algorithm will set backup for hours outside of those when employees are present. The invention does not reside in the particular algorithms used but rather in the recognition that a small office network may be configured substantially based on the entry of user information apparently unrelated to computer operations or functions. Next, step 104, routines are set up for allocating the computer programs and other resources according to the algorithms of step 103. Program routines are set up, step 105, for running the client computers, e.g. 53, 54 and 55 using the programs and other resources allocated as described in steps 103 and 104. Routines are also set up for storing and updating the user entries. This completes the set up.

Figure 13A:
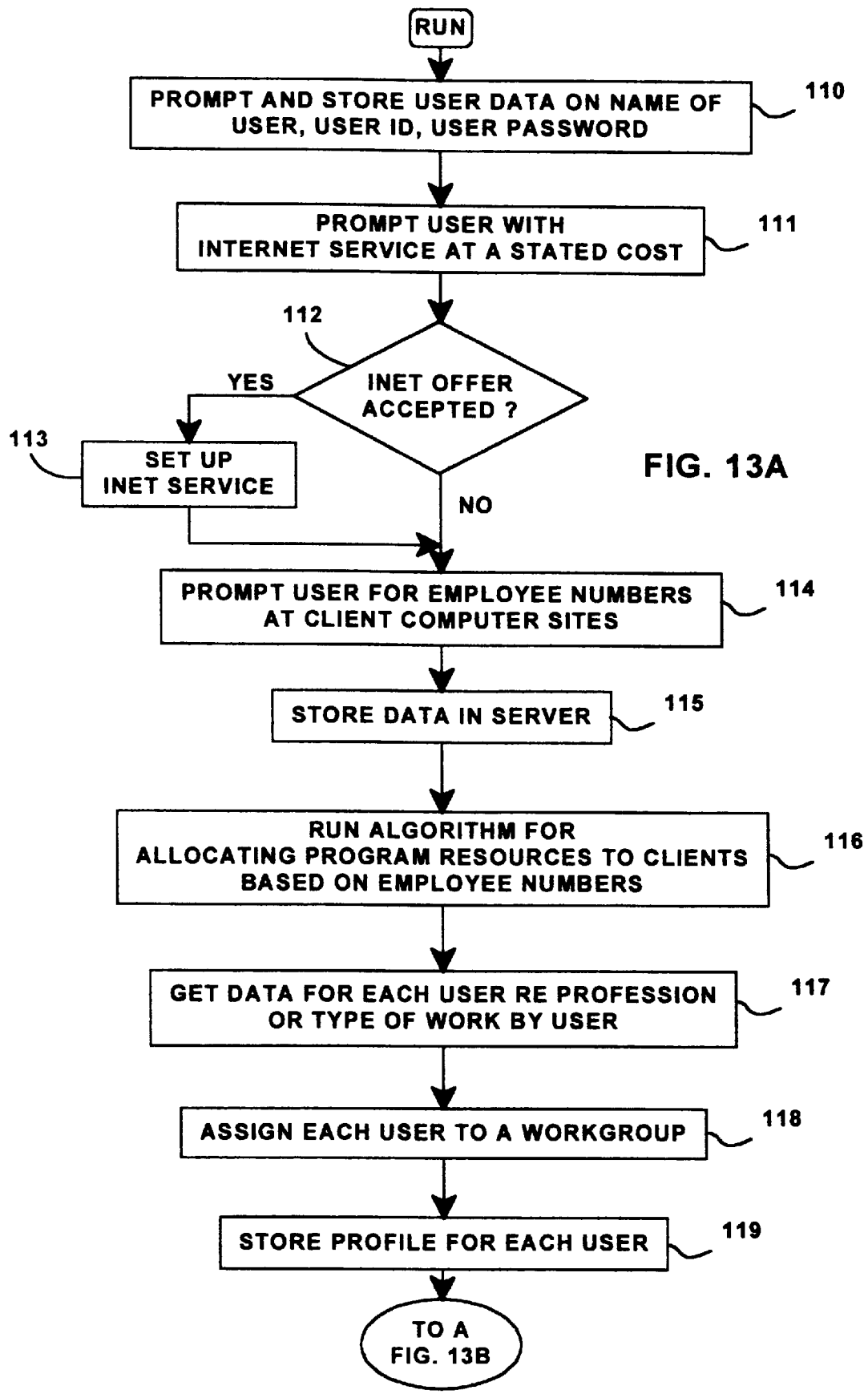

Now with respect to FIGS. 13A and 13B, there will be described a modified program run to illustrate many of the steps involved in the prompts, data entries and storage of the entries described above for FIGS. 3 through 11. In this illustrative program run, not all of the possible combinations of data entries will be described. However, it should be readily understood how other selections and data entries discussed with respect to the present invention may be similarly prompted for, selected, stored and used in algorithms. In the program run, the operator is prompted for user data on name, ID and password, step 110, and then the user is prompted to price out an Internet service provider. If an Internet service provider is selected via decision step 112, Yes (using the display panel of FIG. 6), then the Internet service is set up, step 113. After the Internet service is set up or if none is selected in step 112, the operator is prompted for the various employee numbers which may be expected at the client computer sites, step 114. This data is stored in connection with the server. Then appropriate algorithms may be run for allocating resources to the various client computers based upon employee numbers, step 116. Next, step 117, data is prompted for relative to the profession or type of work of the employee or user. The employee or user may be assigned to a work group for program allocation purposes based upon his type of work, step 118. All of the individual data entered in response to prompts regarding a particular employee or user is stored as a user profile and the flow goes to point"A" in FIG. 13B.

Step 120, employee arrival/departure information is prompted for, this information is stored in the server, step 121. Then an algorithm is run to set up various system backup times based upon the stored arrival/departure information, step 122. In addition, based upon this employee arrival/departure information, algorithms may be run to set file cleaning processes in employee off hours, step 123, to set defragmentation of disk drive files, step 124, or to run antivirus schemes in employee off hours, step 125. Prompts are run, step 126, which use entries about work habits to determine user times in text producing hours and graphics producing hours and an algorithm is set up to convert such information into the allocation of disk drive storage space. Then, as shown in FIG. 11, a series of prompts is used to test user vision levels, step 127, and this information is used in an algorithm, step 128, to adjust screen resolution levels to compensate for vision limitations, step 128.

One described and claimed implementation of the present invention is as an application program made up of programming steps or instructions. Such a program 40 would be resident in RAM 14 of the server, FIG. 1, during computer operations. Until required by the computer system, the program instructions may be stored in another readable medium, e.g in disk drive 20, or in a removable memory such as an optical disk for use in a CD-ROM computer input or in a floppy disk for use in a floppy disk drive computer input. Further the program instructions may be stored in the memory of another computer prior to use in system of the present invention and transmitted over a local area network (LAN) or a wide area network (WAN) such as the Internet when required by the user of the present invention. One skilled in the art should appreciate that the processes controlling the present invention are capable of being distributed in a variety of computer readable media forms.

Although certain preferred embodiments have been shown and described, it will be understood that many changes and modifications may be made therein without departing from the scope and intent of the appended claims.

What is claimed is:

1. A system for the configuration of operations in a network comprising at least a server computer and a respective plurality of client computers connected to each server computer comprising:

means for interactively prompting a user to make a sequence of data entries, each of said entries being apparently unrelated to computer operations, and means for allocating network computing components and operations among the computers in the network in response to and based upon said user entries.

2. The system of claim 1 wherein at least one of said entries covers a demographic aspect of the business environment using the network.

3. The system of claim 2 further including means for correlating said entries to computer operations, said means for allocating said network computing components and operations being responsive to said correlating means.

4. The system of claim 3 wherein said client computers are interactive display computers accessible to users in said business environment, and said system further includes means for storing a user profile of computing components and operations allocated for each user based upon said correlated data entries.

5. The system of claim 3 wherein said means for correlating and said means for allocating are in said server computer.

6. The system of claim 5 wherein said means for storing said user profiles are controlled by said server computer.

7. The system of claim 4 wherein said data entries include entries indicating the working hours of said users in said business environment.

8. The system of claim 4 wherein said data entries include entries indicating the job functions of said users in said business environment.

9. The system of claim 4 wherein said data entries include entries indicating the hours during which said business environment is open.

10. The system of claim 4 wherein said server computer is an interactive display computer and said data entries are made into said server computer.

11. A method for the configuration of operations in a network comprising at least one server computer and a respective plurality of client computers connected to each server computer, including the steps of:

interactively prompting a user to make a sequence of data entries, each of said entries being apparently unrelated to computer operations, and allocating network computing components and operations among the computers in the network based upon said user entries.

12. The method of claim 11 wherein at least one of said entries covers a demographic aspect of the business environment using the network.

13. The method of claim 12 further including the step of correlating said entries to computer operations prior to allocating said network computing components and operations.

14. The method of claim 13 wherein said client computers are interactive display computers accessible to users in said business environment, and further including the step of storing a user profile of computing components and operations allocated for each user based upon said correlated data entries.

15. The method of claim 13 wherein said steps of correlating and allocating are carried out by said server computer.

16. The method of claim 14 wherein said data entries include entries indicating the working hours of said users in said business environment.

17. The method of claim 14 wherein said data entries include entries indicating the job functions of said users in said business environment.

18. The method of claim 14 wherein said data entries include entries indicating the hours during which said business environment is open.

19. The method of claim 14 wherein said server computer is an interactive display computer and said data entries are made into said server computer.

20. A computer program having program code included on a computer readable medium for the configuration of a computer network comprising at least a server computer and a respective plurality of client computers connected to each server computer, comprising:

means for interactively prompting a user to make a sequence of data entries, each of said entries being apparently unrelated to computer operations, and means for allocating network computing components and operations among the computers in the network in response to and based upon said user entries.

21. The computer program of claim 20 wherein at least one of said entries covers a demographic aspect of the business environment using the network.

22. The computer program of claim 21 further including means for correlating said entries to computer operations, said means for allocating said network computing components and operations being responsive to said correlating means.

23. The computer program of claim 22 wherein said client computers are interactive display computers accessible to users in said business environment, and further include means for storing a user profile of computing components and operations allocated for each user based upon said correlated data entries.

24. The computer program of claim 21 wherein said means for correlating and said means for allocating are in said server computer.

25. The computer program of claim 24 wherein said means for storing said user profiles are controlled by said server computer.

26. The computer program of claim 23 wherein said data entries include entries indicating the working hours of said users in said business environment.

27. The computer program of claim 23 wherein said data entries include entries indicating the job functions of said users in said business environment.

28. The computer program of claim 23 wherein said data entries include entries indicating the hours during which said business environment is open.

29. The computer program of claim 23 wherein said server computer is an interactive display computer and said data entries are made into said server computer.

* * * * *